United States Patent [19]
Kawaguchi et al.

[11] Patent Number: 5,355,695
[45] Date of Patent: Oct. 18, 1994

[54] REFRIGERATION DEVICE USING HYDROFLUOROCARBON REFRIGERANT

[75] Inventors: Susumu Kawaguchi; Tatsuaki Shimizu; Hiroshige Konishi; Hitoshi Maruyama; Noboru Masuda; Shinobu Ogasawara, all of Shizuoka; Yoshihiro Sumida; Satoru Toyama, both of Hyogo, all of Japan

[73] Assignee: Mitsubishi Denki Kabushiki Kaisha, Tokyo, Japan

[21] Appl. No.: 982,884

[22] Filed: Nov. 30, 1992

[51] Int. Cl.$^5$ .............................................. F25B 43/02
[52] U.S. Cl. ...................................... 62/498; 62/114; 62/84; 62/503; 62/468
[58] Field of Search ................... 62/84, 468, 498, 502, 62/503, 114; 252/67, 68

[56] References Cited

U.S. PATENT DOCUMENTS

| | | |
|---|---|---|
| Re. 21,033 | 3/1939 | Hirche . |
| 1,884,186 | 10/1932 | Peltier et al. . |
| 2,314,591 | 3/1943 | McCormack . |
| 3,092,981 | 6/1963 | Begeman et al. ............... 62/114 X |
| 3,978,685 | 9/1976 | Taylor ............................... 62/84 X |
| 4,046,533 | 9/1977 | Olund ................................... 62/114 |
| 4,429,544 | 2/1984 | McCarty ................................ 62/84 |
| 4,586,351 | 5/1986 | Igarashi et al. ...................... 62/468 |
| 4,675,971 | 6/1987 | Masserang ....................... 62/503 X |
| 4,715,196 | 12/1987 | Sugiura ................................ 62/468 |
| 4,755,316 | 7/1988 | Magid . |
| 4,851,144 | 7/1989 | McGraw et al. . |
| 5,202,044 | 4/1993 | Hagihara et al. ............... 62/114 X |

FOREIGN PATENT DOCUMENTS

| | | |
|---|---|---|
| 0171815 | 2/1986 | European Pat. Off. . |
| 0406479 | 1/1991 | European Pat. Off. . |
| 0485979 | 5/1992 | European Pat. Off. . |
| 0033981 | 1/1991 | Japan . |
| 3-63474 | 3/1991 | Japan ..................... 62/503 |
| 3-156265 | 7/1991 | Japan ..................... 62/468 |
| 3-156266 | 7/1991 | Japan ..................... 62/468 |
| 3-168565 | 7/1991 | Japan ..................... 62/468 |
| 3-236568 | 10/1991 | Japan ..................... 62/468 |
| 3-236569 | 10/1991 | Japan ..................... 62/468 |

OTHER PUBLICATIONS

Database WPIL, AN-92-232019, & JP-A-04 159 396, Jun. 2, 1992.
Patent Abstracts of Japan, vol. 16, No. 219, (C-943), May 22, 1992, & JP-A-04 041 592, Feb. 12, 1992.
Recent Trend of Refrigeration Oils by Takashi Kaimai, Kyodo Oil Technical Research Center Co., Ltd. (17-35, Niizominami 3-chome, Toda-shi, Saitama 335) pp. 621-626.

*Primary Examiner*—Henry A. Bennet
*Assistant Examiner*—C. Kilner
*Attorney, Agent, or Firm*—Oblon, Spivak, McClelland, Maier & Neustadt

[57] ABSTRACT

A refrigeration device comprising a compressor, a condenser, an evaporator, an accumulator and a refrigerant is described. Lubricating oil present in the compressor is chosen so as to be insoluble with the refrigerant, and a particular accumulator design is described to ensure return of oil back to the compressor.

31 Claims, 5 Drawing Sheets

REFRIGERATION DEVICE USING HYDROFLUOROCARBON REFRIGERANT

BACKGROUND OF THE INVENTION

1. Field of the Invention

This invention relates to refrigeration devices such as refrigerant compressors, refrigerators and refrigerating air conditioners which use a refrigerant containing a hydrofluorocarbon as a main ingredient.

2. Description of the Conventional Art

Conventional refrigeration units use chlorine-containing flons (e.g. chloro-difluorocarbon CFC12) as refrigerants, and mineral oils or synthesis oils which are soluble with the refrigerant, such as alkyl benzene oil, as lubricating oil. Recently, however, it has been discovered that flon refrigerants containing chlorine destroy the ozone layer. Therefore, flons containing chlorine are being replaced by flons containing hydrogen which will not affect the environment, such as hydrofluorocarbon HFC134a. One example of a conventional refrigeration unit in which the hydrofluorocarbon HFC134a is used as a refrigerant is shown in FIG. 8.

As disclosed in the publication "Tribologist" vol. 35, No. 9 (1990), pp 621–626, where a refrigeration unit is provided using a hydrofluorocarbon refrigerant, namely, HFC134a refrigerant, the mutual solubility of the refrigerant and the refrigerating machine oil is an important factor. That is, since mineral oils or synthesis oils which are used as a lubricating oils in conventional refrigeration devices using CFC12 refrigerant are insoluble with the HFC134a refrigerant, these mineral oils and synthesis oils can not be used in refrigeration units in which HFC134a refrigerant is used. Therefore, PAG (polyoxyalkyleneglycol) or ester group refrigerating machine oils which are soluble with HFC134a refrigerant are employed. FIG. 8 shows a refrigeration unit which uses an HFC134a refrigerant. In FIG. 8, reference numeral 1 designates a compressor for compressing a refrigerant gas; 2, a condenser for condensing a high pressure refrigerant gas discharged from the compressor 1; 3, a capillary tube; 4, an evaporator; 5, an accumulator which adjusts the amount of refrigerant; and 6, refrigerating machine oil pooled in compressor 1 for lubrication of the slide parts of the compressor 1 and for sealing of the compressor chamber. The refrigerating machine oil 6 is PAG 6a or an ester group refrigerating machine oil 6b.

The behavior of the oil in the refrigeration unit will now be described. The refrigerant compressed by compressor 1 is supplied to condenser 2. In the case of a compressor with a high pressure container, although a large part of lubricating oil 6 which is used for sealing the compression chamber is separated from the refrigerant, the lubricating oil 6 which is of the order of 0.5 to 1.0% by weight of the refrigerant is discharged from the compressor together with the refrigerant. The lubricating oil 6 thus discharged, being soluble with the refrigerant, is high in fluidity and is therefore returned through condenser 2, capillary tube 3, evaporator 4 and header 5 to compressor 1. Thus, the lubricating oil 6 is present in compressor 1 at all times; that is, the lubrication is carried out suitably at all times. Furthermore, even when compressor 1 is not operated for long periods of time; that is, even when the refrigerant is held still, its foaming can be prevented.

Conventional refrigeration units using HFC134a refrigerant are constructed as described above. The PAG 6a oil has a volume resistivity of $10^7$ to $10^{10}$ $\Omega$.cm, and a saturated water content of about 2500 ppm; and the ester group refrigerating machine oil has a resistivity and water content of $10^{12}$ to $10^{14}$ $\Omega$.cm and about 1500 ppm, respectively. Both oils are much lower in electrical insulation and in hygroscopicity than refrigerating machine oils used with CFC12 refrigerant (which has an about $10^{15}\Omega$.cm volume resistivity and about 500 ppm saturated water content). The electrical insulation greatly affects the long range reliability of the compressor. In order to suitably handle the components of the compressor, or the compressor itself, the saturated water content should as low as possible.

Furthermore, in assembling a refrigerator, production quality suffers from a number of problems in handling the machine oil; for instance, it is necessary to shorten the period of time for which the refrigeration circulation system is open. When a large quantity of water gets in the refrigeration circulation system, it tends to form sludge, or freeze in the circulation system and clog up the capillary tube, thus impairing the refrigerating action.

Furthermore, if, in conventional refrigeration units using HFC134a refrigerant, the oil is high in hygroscopicity it will suffer from the following difficulties: that is, it is rather difficult to prevent the components of the compressor from rusting and ice may be formed in the capillary tube and the expansion valve of the refrigeration unit, clogging them up. Hydrolysis of the ester oil is accelerated by the water content, resulting in formation of sludge. In addition, hydrolysis of any polyethylene-terephthalate material employed as insulation material for the motor is accelerated, thus resulting in the further formation of sludge. In order to eliminate the above-described difficulties in the manufacture of a refrigeration unit using HFC134a it is necessary to remove water from the machine oil and the refrigerant circuit more carefully than for a refrigeration unit using CFC12 refrigerant. That is, it is necessary to increase the water removing ability of a dryer in the refrigerant circuit. For this purpose, it is necessary to use a dryer having a larger capacity.

Moreover, conventional refrigerating units using HFC134a refrigerant are disadvantageous in the following point: when the compressor is stopped, the liquid-phase refrigerant is returned to the compressor through its suction inlet. When it is started again, the lubricating oil in the compressor is led into the refrigerant circular system together with the liquid-phase refrigerant. Since the HFC134a refrigerant is low in solubility with the lubricating oil, it is difficult for the lubricating oil thus led to return into the compressor until its flow rate reaches a certain value. That is, the lubricating oil is not sufficiently supplied to the compressor, so that the compressor may break down.

SUMMARY OF THE INVENTION

Accordingly, an object of this invention is to eliminate the above-described difficulties. More specifically, an object of the invention is to provide a refrigeration device which is operated satisfactorily wherein the oil applied to the electric motor provided for the compressor, the oil impregnated into the sintered components, and the oil used in assembling the compressor is improved in hygroscopicity and is high in electrical insulation; a refrigeration device in which low temperature fluidity is established for the oil in the evaporator and the header, and the oil film formed on the inner wall of the evaporator is thin, thus preventing the reduction in heat-exchange efficiency; and a refrigeration device excellent in electrical insulation and in hygroscopicity in which the refrigerating machine oil is smoothly and positively returned to the compressor so that the refrigeration device is highly reliable.

According to the first aspect of the invention, a refrigeration device is provided having a refrigeration circulation system which uses a hydrofluorocarbon refrigerant, such as an HFC134a refrigerant, and comprising a compressor, an evaporator and an accumulator; the compressor uses a lubricating oil which is insoluble with the refrigerant, and has a suction pipe which has an oil return hole in the upper portion thereof which pipe is inserted into the accumulator from below, and the evaporator has an outlet which is connected to the upper end portion of the accumulator.

Further, according to the invention, alkyl benzene or poly-α-olefin oil is employed as a process oil which is applied to parts of the compressor, and is used in assembling the compressor.

Furthermore, in the refrigeration device described above, a refrigerating machine oil is employed which is 2000 cst or less in viscosity at an evaporation temperature of the refrigeration device.

Furthermore, in the refrigeration device described above, a compressor of high pressure container type is employed.

Furthermore, in the refrigeration described above, the refrigerant is allowed to flow downwardly in an accumulator, and an end portion of a lower pipe is inserted into the accumulator.

Furthermore, in the refrigeration device described above, a mechanism for preventing a backflow from a compressor to an evaporator is provided the compressor and the evaporator.

Furthermore, in the refrigeration device described above, a refrigerating machine oil is employed which is 200 cst or less in viscosity at an operating ambient temperature of the refrigeration device.

In assembling the refrigerant compressor of the invention, the control of water content can be achieved in a fashion similar to the case of a conventional CFC12 refrigerant compressor.

The refrigeration device of the present invention is excellent in electrical insulation and in hygroscopicity. And, in the refrigeration device, the oil returns smoothly to the compressor.

In the refrigerating air conditioner of the invention, the oil employed is improved in volume resistivity and is less hygroscopic when compared with ester oil or PAG oil. Therefore, the refrigerating air conditioner is equivalent to a conventional one using CFC12 refrigerant with respect to the control of water content when assembled.

With the refrigerating air conditioner, in assembling the compressor, the control of water content can be performed similarly as in the case of the conventional CFC12 refrigerant compressor. Further, low temperature fluidity is established for the oil in the evaporator and the header, and the oil film formed on the inner wall of the evaporator is thin, which prevents a reduction in heat-exchange efficiency. Thus, its cooling capacity is substantially equal to that provided when an oil soluble in the refrigerant is used.

With the refrigerating air conditioner of the invention, the quantity of refrigerant can be reduced as much as 10% to 20% by weight of the quantity of oil sealed in it as compared with that provided when an oil soluble in the refrigerant is used.

Furthermore, in the refrigerating air conditioner of the invention, the refrigerating machine oil is positively returned to the compressor without being detained in the header, and an excess of refrigerant can be saved depending on the conditions of the refrigeration load. In the refrigerating air conditioner, a difficulty is eliminated that, when the compressor is stopped, the gas leaks from the high pressure side to reach the header and the evaporator through the suction pipe to increase the temperature of the latter. This contributes to a reduction of the power consumption. Further, the capillary tube is prevented from being clogged up by the oil. Thus, the refrigerating air conditioner is high in reliability.

DETAILED DESCRIPTION OF THE PREFERRED EMBODIMENTS

Figure 1:
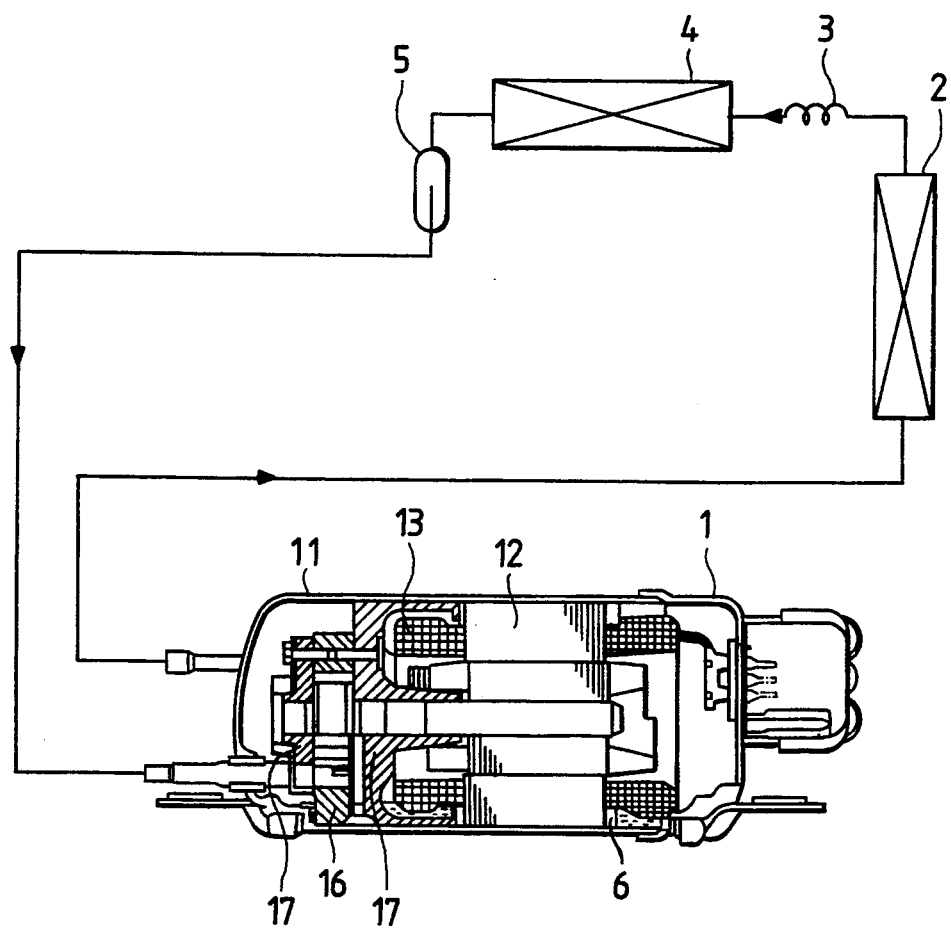
FIG. 1 is a diagram showing the arrangement of a refrigeration unit using a refrigerant compressor, which constitutes one embodiment of this invention.

A first embodiment of this invention will be described with reference to FIG. 1. In FIG. 1, reference numeral 11 designates a closed container; 12, an electric motor for driving compressor 1; and 13, an insulated wire in the motor 12. A hard alkyl benzene oil is applied to improve the slidability of the wire, thereby to achieve the wire winding operation with higher efficiency. A cylinder 16 forming the compressor chamber, and sintered components such as bearings 17 are impregnated with the hard alkyl benzene oil. In assembling the slide parts of the compressor, the hard alkyl benzene oil is applied.

In a refrigeration unit using an HFC134a refrigerant as shown in FIG. 1, the aforementioned hard alkyl benzene oil is employed as the refrigerating machine oil 6 in the compressor 1.

In the refrigerant compressor 1 constructed as described above, the hard alkyl benzene ail is employed as a coating oil, impregnating oil, and assembling oil, for the components. The alkyl benzene oil is low in hygroscopicity. Therefore, the components of the compressor can be handled similarly as in the case of those of the conventional compressor using CFC12 refrigerant. Further, the hard alkyl benzene oil employed as the refrigerating machine oil is high in electrical insulation ($10^{15}$ to $10^{16}$ Ω.cm in volume resistivity). Therefore, countermeasures against the electric leakage may be the same as in compressors using CFC12 refrigerant.

Figure 2:
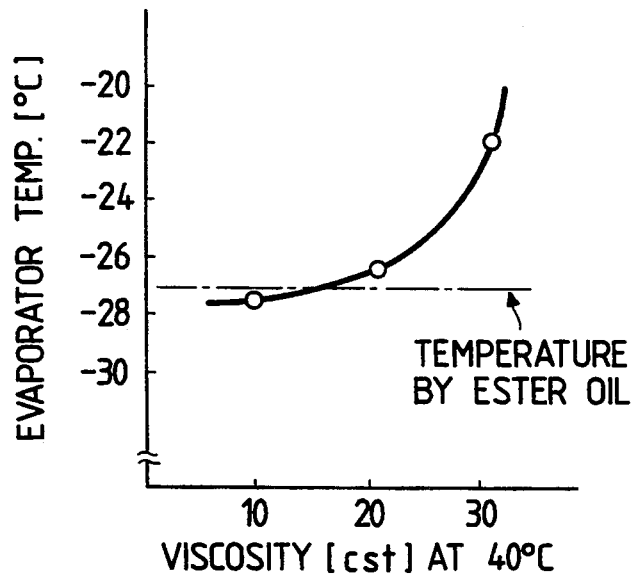
FIG. 2 is a graphical representation indicating viscosities of hard alkyl benzene oil with attainable temperatures of an evaporator.

Furthermore, in the refrigeration unit using HFC134a refrigerant as shown in FIG. 1, a hard alkyl benzene oil low in viscosity (hereinafter referred to as "a low viscosity hard alkyl benzene oil", when applicable) can be employed as the lubricating oil of the compressor 1. The low viscosity hard alkyl benzene oil is lower in viscosity than a hard alkyl benzene oil employed, as lubricating oil, in a conventional CFC12 refrigerant compressor. Heretofore, a refrigeration unit such as a refrigerator equipped with a rotary compressor employs a lubricating oil which is around 31 cst in viscosity at a temperature of 40° C.; however, in the evaporator 4, the lubricating oil is of the order of 1000 to 5000 cst with the solubility of the refrigerant taken into account. Hence, in order to allow a low viscosity hard alkyl benzene oil in which the HFC134a refrigerant is insoluble to have the same viscosity in the evaporator, the viscosity should be of the order of 10 to 22 cst at a temperature of 40° C. In the case where, as was described above, the lubricating oil in the evaporator 4 is held the same in viscosity, the fluidity and the thickness of the oil film on the inner wall of the evaporator can be substantially the same as those in the conventional case where the CFC12 refrigerant is employed. FIG. 2 shows the relationship between the viscosity of the hard alkyl benzene oil at a temperature of 40° C. and the attainable temperature of the evaporator 4 provided When the compressor of the refrigeration device is operated continuously. With an oil 10 cst in viscosity at a temperature of 40° C., the attainable temperature is substantially equal to that in the case of the ester oil 32 cst at a temperature of 40° C.; that is, the cooling capacity is sufficiently high. On the other hand, the viscosity of the oil at the slide parts inside the compressor 1 depends whether or not the oil is soluble in the refrigerant. However, the solubility of the CFC12 refrigerant in the oil at the slide parts inside the compressor 1 is substantially equal to the solubility of the CFC12 refrigerant in the evaporator 4. Hence, when the above-described low viscosity oil is used in the atmosphere of HFC134a refrigerant, then even at the slide parts the viscosity and the lubrication can be substantially equal to those in the case of the lubrication oil 6c in the CFC12 refrigerant compressor.

It should be noted that usage of the low viscosity hard alkyl benzene oil will not adversely affect the assembling work at all.

Figure 3:
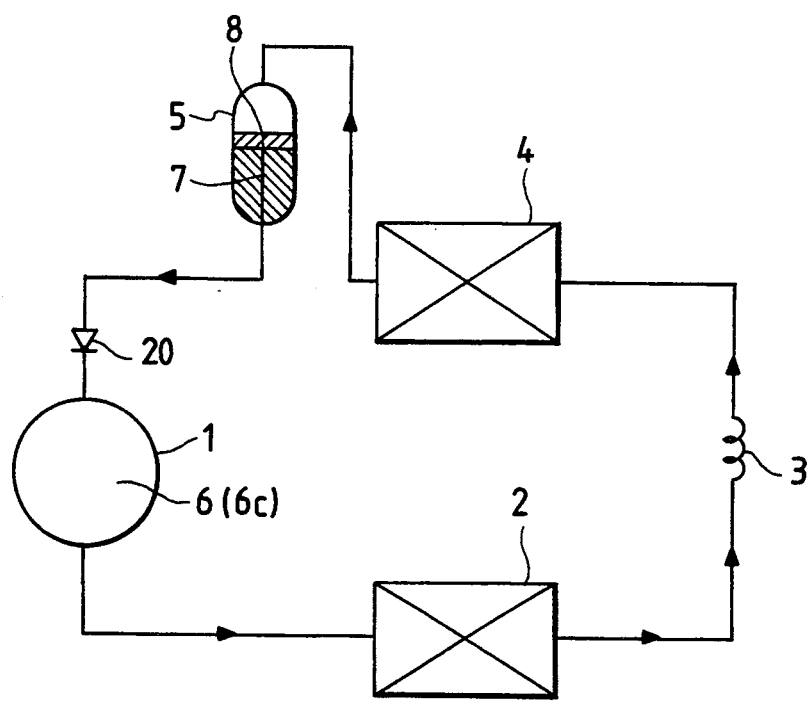
FIG. 3 is a diagram showing refrigeration circuit in a refrigerator, which constitutes another embodiment of the invention.
Figure 4:
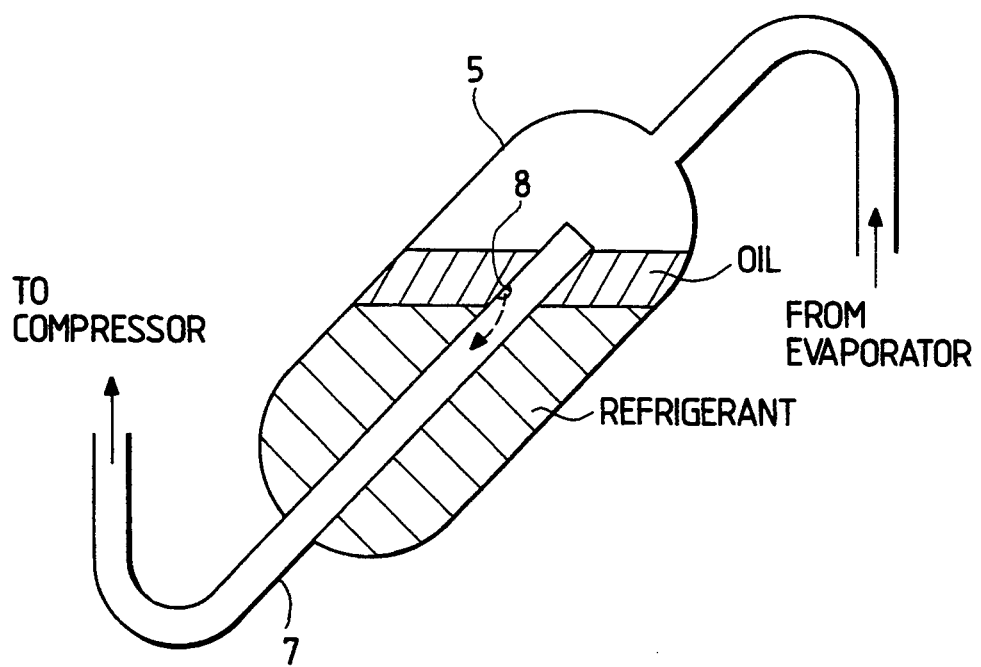
FIG. 4 is a diagram showing a part of the refrigeration circuit in the refrigeration in more detail.

In FIGS. 3 and 4, reference numeral 1 designates a compressor for compressing a refrigerant gas; 2, a condenser for condensing a high pressure refrigerant gas discharged from the compressor 1; 3, a capillary tube; 4, an evaporator; 5, an accumulator as a refrigerant pool having a function of adjusting the amount of refrigerant; and 6, a lubricating oil which is held in the compressor 1, lubricating slide parts of the latter and sealing the compression chamber. The lubricating oil is a hard alkyl benzene oil 6a which is insoluble with an HFC134a refrigerant. The upper end portion of the accumulator 8 is connected to the outlet of the evaporator 4, and the lower end portion is connected to the suction side of the compressor 1, the suction pipe 7 of which is inserted into the accumulator 5 in such a manner that it is extended upwardly. The suction pipe 7 has an oil return hole 8 in its side wall. More specifically, the hole 8 is formed in the side wall of the upper portion of the suction pipe 7.

Since the hard alkyl benzene oil is insoluble with the HFC134a refrigerant and has a smaller specific gravity than the HFC134a refrigerant, the HFC134a refrigerant is detained in the lower part of the accumulator 5 while the hard alkyl benzene oil is detained upper part of the accumulator 5. Therefore, the oil detained at the upper portion is returned to compressor 1 by the oil return hole 8 which is formed at the side wall of the suction pipe 7 which is inserted into the accumulator 5 form below. Accordingly, the oil in the compressor can be prevented from decreasing due to the detainment of much of the oil in accumulator 5.

Figure 8:
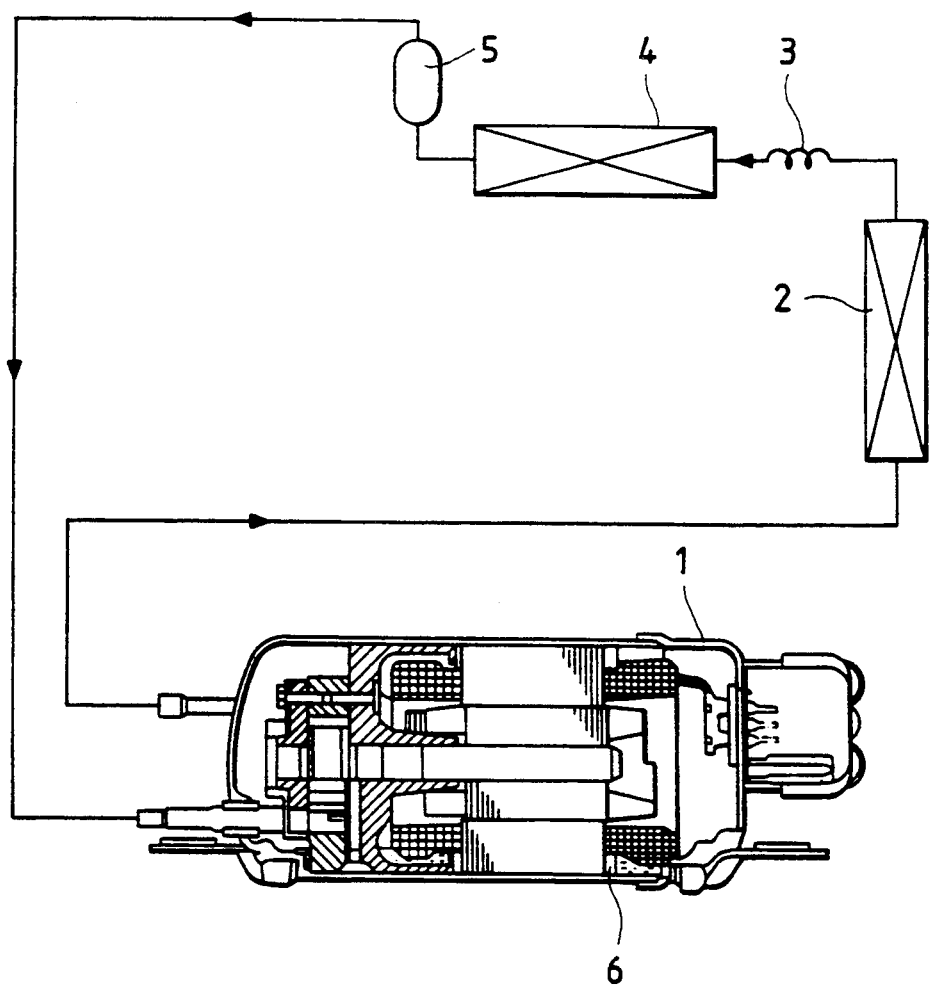
FIG. 8 is a diagram showing the arrangement of a refrigeration unit using a conventional refrigerant compressor.

In the conventional refrigeration de vice as shown in FIG. 8, the lower end portion of the accumulator 5 is connected to the outlet of the evaporator 4, and the upper end portion is connected to the suction side of the compressor 1, and the pipe inserted into the accumulator from below forms a refrigerant pooling section. Therefore, in the case of an ester oil soluble in the HFC134a refrigerant being employed, the ester oil is dissolved in the refrigerant, and therefore it is not detained in the accumulator 5; that is, it is returned to the compressor 1; and in the case of the hard alkyl benzene oil insoluble in the HFC134a refrigerant being employed, the hard alkyl benzene oil is detained in the accumulator 5, so the quantity of oil in the compressor 1 is decreased as much, whereby the slide parts in the compressor are not sufficiently lubricated, and the compression chamber is not sufficiently sealed.

On the other hand, in the embodiment, as was described above, the upper end portion of the accumulator 5 is connected to the outlet of the evaporator 4, and the lower end portion is connected to the suction side of the compressor 1, and the oil return hole 8 is formed in the side wall of the suction pipe 7 which is inserted into the accumulator 5 from below. Hence, even if the oil is not dissolved in the refrigerant, the oil is returned to the compressor 1; that is, it will never be detained in the accumulator 5.

As was described above, the oil return hole 8 is formed in the upper portion of pipe 7. Therefore, the oil, being smaller in specific gravity than the HFC134a refrigerant, returns to the compressor 1. And in the accumulator 5, the refrigerant is collected below the oil return hole 8. Thus, the function of adjusting the variation in load of the refrigerator is performed satisfactorily; that is, the cooling operation is suitably achieved with high efficiency.

The alkyl benzene oil is not soluble in the HFC134a refrigerant, and therefore the quantity of refrigerant is less both in absolute value and in the rate of change which is dissolved in the oil 6 in the compressor 1 when the ambient temperature or the load condition of the refrigerator changes. This results in the following advantages: the accumulator 5 for adjusting the quantity of refrigerant can be miniaturized and the difficulty of improper cooling operation is avoided because the proper quantity of refrigerant is used. That is, the refrigeration unit operates with high efficiency. In the case where a high pressure container type rotary compressor is employed, the quantity of refrigerant in it can be reduced by 10% to 20% of the quantity of oil therein.

In the above-described embodiments, the HFC134a refrigerant and the hard alkyl benzene ail are employed. However, the same effects can be obtained by using any other combination of refrigerant and oil which are not soluble with each other.

Figure 5:
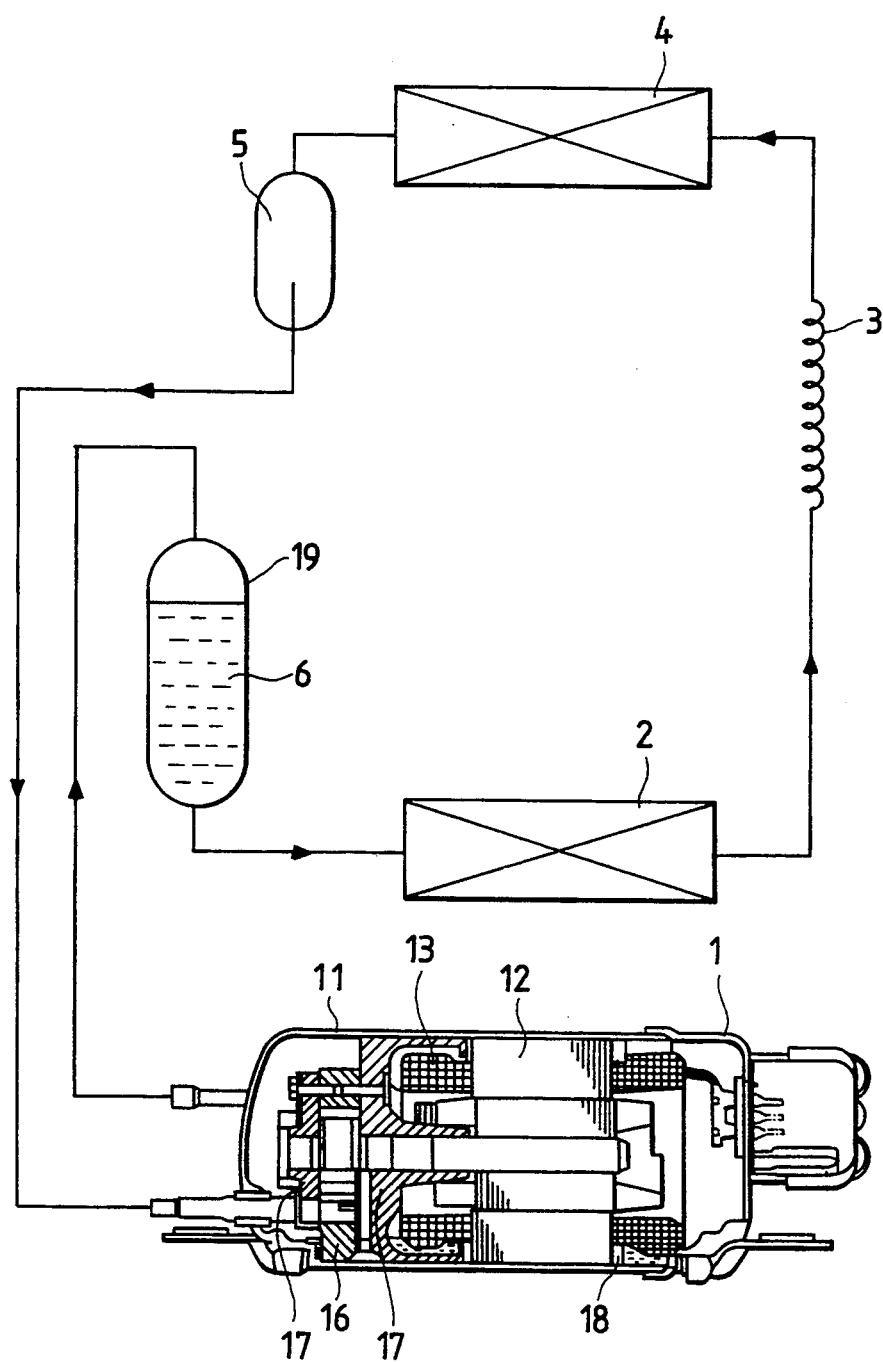
FIG. 5 is a diagram showing the arrangement of a refrigerating air conditioner, which constitutes another embodiment of the invention.
Figure 6:
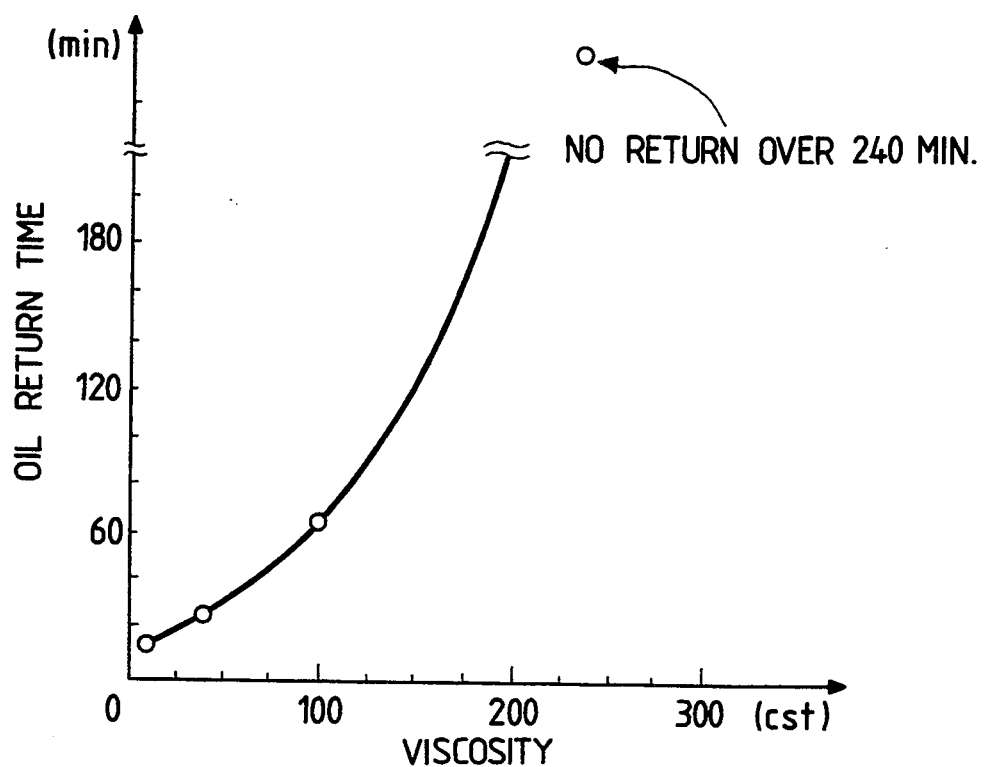
FIG. 6 is a graphical representation indicating oil return times of the refrigerating air conditioner with oil viscosities at an operating ambient temperature thereof.

A second embodiment of the invention will now be described. In the second embodiment, a hard alkyl benzene oil is employed as a refrigerating machine oil. It has been confirmed through experiments that, in the case where an oil is used for a refrigerator which is smaller than 200 cst in viscosity at an ambient operating temperature and is soluble in a given refrigerant, it will return to the compressor even when it flows out excessively so as to close the capillary tube of the refrigerator. FIG. 5 shows an experimental apparatus used for investigation of the above-described fact, and FIG. 6 indicates the results of investigation.

In the apparatus shown in FIG. 5, an oil pool 19 is provided on the high pressure side of the refrigerant circuit of a refrigeration device, and the oil is removed from its compressor 1, and an HFC134a refrigerant 18 is held in the latter 1. Under these conditions, compressor 1 is started for investigation of the behavior of the oil. When the compressor is started in this way, the refrigerant 18 is compressed, and the discharge pressure is gradually increased. However, and as is apparent from FIG. 6, as the oil viscosity increases and the ambient temperature decreases, the rate of return of the oil to compressor 1 is decreased. As is seen from FIG. 6, when the oil viscosity is more than 200 cst at a given ambient temperature, the oil, clogging up the capillary tube 3, will not return for at least 240 minutes. In the case where the oil viscosity is smaller than 200 cst, then the oil will be returned in several tens of minutes; that is, the oil will not clog up the capillary tube. Hence, by setting the oil viscosity to less than 200 cst at an ambient operating temperature, a refrigeration unit can be provided in which the oil is positively returned to the compressor even under extreme conditions.

Figure 7:
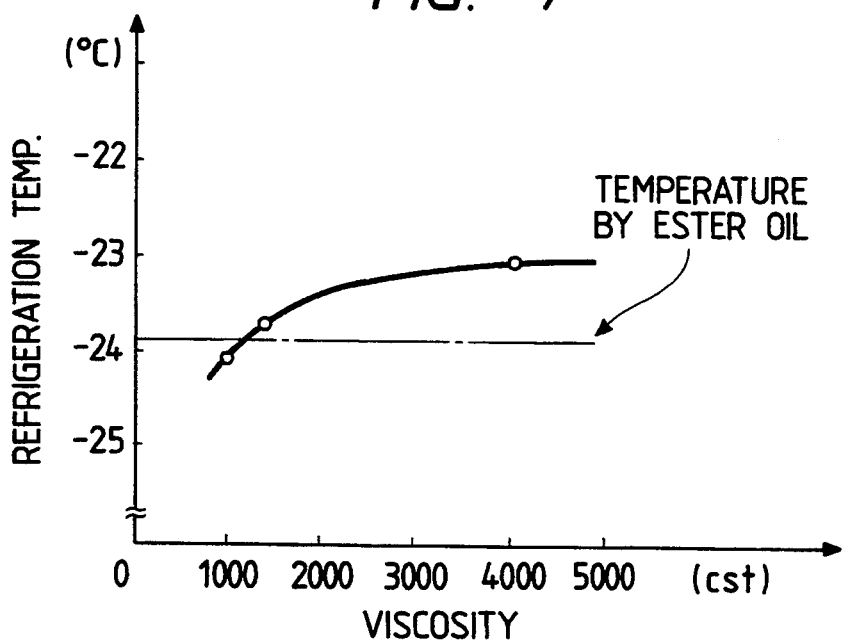
FIG. 7 is a graphical representation indicating refrigeration chamber temperatures of a refrigerating air conditioner, which constitutes another embodiment of the invention, with oil viscosities at an evaporation temperature thereof.

In the case where a refrigeration unit employs an oil whose viscosity is smaller than 2000 cst at an evaporation temperature thereof, its cooling performance is equivalent to that in the case where it employs an oil soluble in the refrigerant. FIG. 7 indicates relationships between oil viscosity and cooling performance in the case where a refrigerator is operated continuously. As is apparent from FIG. 7, in the case where the oil viscosity is smaller than 2000 cst at the evaporation temperature, an ultimate temperature can be obtained which is substantially equal to that which is obtained when an ester oil is used.

In the invention, the oil is not soluble in the refrigerant. Therefore, in the case where a high pressure container type compressor is employed, the phenomenon of the refrigerant becoming larger or smaller in quantity than required is avoided because the quantity of refrigerant dissolved in the oil 6 in compressor 1 changes with the ambient temperature. For the same reason, the quantity of refrigerant to be used can be reduced as much as it is not soluble in the oil 6. More specifically, in the refrigeration unit, the quantity of refrigerant corresponding to 10% to 20% by weight of the quantity of oil can be reduced when compared with the case where an oil soluble in the refrigeration is used.

In FIG. 3, reference numeral 20 designates a check valve, which is set between the compressor 1 and the evaporator 4.

The refrigerant is separate from the refrigerant oil, and its viscosity is lower than the viscosity of the solution formed by dissolution of the refrigerant and the oil. Therefore, when the compressor 1 is stopped, the refrigerant flows well, as a result of which the refrigerant quantity is increased which increase tends to flow back to the evaporator 4 through the gap of the slide parts of compressor 1, so that the temperature of the evaporator 4 is increased, and the power consumption of the refrigeration unit is increased. In order to eliminate this difficulty, check valve 20 is provided between the compressor 1 and the evaporator 4, to prevent the back flow of the refrigerant thereby to prevent the temperature rise of the evaporator. Check valve 20 may be replaced by a back-flow preventing mechanism having the same function.

In the above-described embodiment, hard alkyl benzene oil is employed as the refrigerator oil 6. However, the same effects can be obtained by using one or some of the refrigerator oils such as a soft alkyl benzene oil, poly-olefin, paraffin mineral oil, and naphthene mineral oil, which are excellent in low temperature fliuidity.

The above-described refrigerator oils may be used satisfactorily as they are, without additives. However, characteristics such as wear resistance, load resistance and thermal stability may be improved by adding one or more of an oxidation inhibitor, extreme pressure additive, wear preventing agent, thermal stability improving agent, and defoaming agent.

The oxidation inhibitor comprises a hindered phenol group, amine group, or sulfur group. Examples of the oxidation inhibitor are 2, 6-di-t-butyl-4-methylphenol; 4, 4'methylenebis (2, 6-di-t-butylphenol); 2, 2'-thio-bis (4-methyl-6-t-butylphenol); trimethyl hydroquinone; p, p'5 diactyl-diphenylamine; 3, 7-diactylphenthiazine; alkylphenothiazine-1-carboxylate; phenyl-2-naphthylamin; 2, 6-di-t-butyl-2-dimethyl-p-cresol; 5-ethyl-10, 10'-diphenylphenazaline, and alkyl disulfide, each of which is used in as much as 0.2 to 5% by weight.

Examples of the extreme pressure additive and the wear preventing agent are ester phosphate, ester phosphite, alkyl or aryl-phosphorothionate, halogenohydrocarbon, halogenated carbonic acid, dialkyl- or diaryl-dithiophosphate metallic acid, dialkyldithiocalbamic acid metallic salt, and oil soluble molybdenum sulfide containing compounds, each of which is used in as much as 1 to 30% by weight.

An example of the thermal stability improving agent is an epoxy compound, which is used in as much as 0.2 to 5% by weight.

Examples of the defoaming agent are dimethyl polysiloxane, and carboxylic metal salt, each of which is used in as much as 0.001 to 0.1% by weight.

In the refrigerant compressor using an HFC134a refrigerant according to the present invention, oil applied to components of the compressor and used in assembling the compressor is insoluble in the refrigerant. Therefore, the refrigerant compressor can be readily assembled, and the components can be also readily handled.

In the refrigeration device having the refrigeration circular system which uses HFC134a refrigerant and comprises a compressor, an evaporator, and an accumulator, the compressor uses a lubricating oil insoluble with the refrigerant, and has a suction pipe which has an oil return hole in the upper portion thereof, and is inserted into the accumulator from below, the outlet of the evaporator being connected to the upper end portion of the accumulator. Hence, the refrigeration device is excellent in electrical insulation and in hygroscopicity. Further, in the refrigeration device, the oil returns smoothly to the compressor. Thus, the refrigerator is highly reliable. Moreover, the refrigerating machine oil employed for the compressor is insoluble in the refrigerant. Hence, the refrigeration unit is high in electrical insulation.

Furthermore, alkyl benzene or poly-α-olefin oil is employed as the oil which is applied to the parts of the compressor, and used in assembling the latter. Therefore, the compressor can be readily assembled, and the components can be handled with ease. The oil employed is lower in hygroscopicity than ester oil or PAG oil. Thus, control of water content can be achieved as in conventional refrigerating air conditioners using CFC12 refrigerant.

In the refrigeration device, the refrigerating machine oil is employed which is 2000 cst or less, in viscosity at an evaporation temperature of the refrigeration device. Hence, low temperature fluidity is established for the oil in the evaporator, and the oil film formed on the inner wall of the evaporator is thin, which prevents a reduction in heat-exchange efficiency. Thus, its cooling capacity is substantially equal to that provided when an oil soluble in the refrigerant is used.

Since the refrigeration device employs a compressor of a high pressure container type, the quantity of refrigerant can be reduced as much as 10 to 20% by weight of the quantity of oil sealed in it as compared with that provided when an oil soluble in the refrigerant is used.

In the refrigeration device, the refrigerant is allowed to flow downwardly in the header, and the end portion of the lower pipe is inserted into the header. Therefore, the refrigerating machine oil is positively returned to the compressor without being excessively detained in the header, and an excess of refrigerant can be saved depending on the conditions of the refrigeration load.

In the refrigeration device, the mechanism for preventing the back flow from the compressor to the evaporator is provided between the compressor and the evaporator. Hence, the difficulty is eliminated that, when the compressor is stopped, the gas leaks from the high pressure side to reach the header and the evaporator through the suction pipe to raise the temperature of the latter. This will contribute to a reduction in power consumption.

In the refrigeration device, the refrigerating machine oil is employed which is 200 cst or less in viscosity at an operating ambient temperature of the refrigerating air conditioner. Hence, the capillary tube is prevented from being clogged up by the oil. Thus, the refrigerating air conditioner is highly reliable.

What is claimed is:

1. A closed-loop refrigeration device comprising a compressor, a condenser, an evaporator, a refrigerant, a lubricating oil, an accumulator and a suction pipe;
    said refrigerant comprising a hydrofluorocarbon as a main ingredient;
    said lubricating oil being stored in said compressor for lubricating movable members thereof and having a smaller specific gravity than the refrigerant and being insoluble with said refrigerant;
    an upper end portion of said accumulator being connected to an outlet of said evaporator;
    one end of said suction pipe being inserted into said accumulator upwardly from below, another end of said suction pipe being connected to an introduction port of said compressor;
    said suction pipe and said accumulator forming a refrigerant pooling section between a bottom of said accumulator and an opening provided in a wall of that portion of said suction pipe inserted into said accumulator for storing said refrigerant and said insoluble lubricating oil in a phase separated state;
    wherein said device is arranged such that said refrigerant and said lubricating oil flow downwardly through said suction pipe from an upper end of said accumulator during operation.

2. A refrigeration device as claimed in claim 1, wherein said lubricating oil is one of alkyl benzene oil and poly-α-olefin oil.

3. A refrigeration device as claimed in claim 1, wherein said lubricating oil has a viscosity of 2000 cst or less at an evaporation temperature of said device.

4. A refrigeration device as claimed in claim 1, wherein said lubricating oil has a viscosity of 200 cst or less in viscosity at an ambient temperature of said device.

5. A refrigeration device as claimed in claim 1, wherein said compressor is a discharge pressure type compressor whose pressure in a shell is kept at a discharge side.

6. A refrigeration device as claimed in claim 1, further comprising means for preventing back flow from said compressor to said evaporator, said means being located between said compressor and said evaporator.

7. A refrigeration comprising the refrigeration device of claim 1.

8. An air conditioner comprising the refrigeration device of claim 1.

9. A closed-loop refrigeration device as claimed in claim 1, wherein said compressor comprises insulated motor wire coated with hard alkyl benzene oil and sintered bearings impregnated with hard alkyl benzene oil.

10. A closed-loop refrigeration device as claimed in claim 1, wherein said suction pipe has a single opening in its side wall.

11. A closed-loop refrigeration device comprising a compressor, a condenser, an evaporator, a hydrofluorocarbon refrigerant and a lubricating oil, wherein said refrigerant is insoluble in said lubricating oil at operating temperatures of the device and said lubricating oil has a smaller specific gravity than said refrigerant.

12. A refrigeration device as claimed in claim 11, wherein said lubricating oil is one of alkyl benzene oil and poly-α-olefin oil.

13. A refrigeration device as claimed in claim 11, wherein said lubricating oil has a viscosity of 2000 cst or less at an evaporation temperature of said device.

14. A refrigeration device as claimed in claim 11, wherein said lubricating oil has a viscosity of 200 cst or less in viscosity at an ambient temperature of said device.

15. A refrigeration device as claimed in claim 11, wherein said compressor is a discharge pressure type compressor whose pressure in a shell is kept at a discharge side.

16. A refrigeration device as claimed in claim 11, further comprising means for preventing back flow from said compressor to said evaporator, said means being located between said compressor and said evaporator.

17. A refrigerator comprising the refrigeration device of claim 11.

18. An air conditioner comprising the refrigeration device of claim 11.

19. A closed-loop refrigeration device as claimed in claim 11, wherein said compressor comprises insulated motor wire coated with hard alkyl benzene oil and sintered bearings impregnated with hard alkyl benzene oil.

20. A refrigeration air conditioning system comprising:
a closed-loop refrigerant circuit for circulating a refrigerant containing hydrofluorocarbon as its main ingredient, in which a compressor, a condenser and an evaporator are connected by pipes wherein
bearings of said compressor are assembled by applying a first oil which is insoluble with said refrigerant as a process oil, and
a housing of said compressor is provided for storing a second oil which is insoluble with said refrigerant and has a smaller specific gravity than said refrigerant as a lubricating oil in a single or mixed state.

21. A refrigeration air conditioning system as claimed in claim 20, further comprising a motor for driving said compressor, windings of which have applied thereto a third oil which is insoluble with said refrigerant as a process oil.

22. A refrigeration air conditioning system as claimed in claim 20, wherein said lubricating oil is one of alkyl benzene oil and poly-α-olefin oil.

23. A refrigeration air conditioning system as claimed in claim 21, wherein said lubricating oil is one of alkyl benzene oil and poly-α-olefin oil.

24. A refrigeration air conditioning system as claimed in claim 20, wherein said lubricating oil is 2000 cst or less in viscosity at an evaporation temperature of said refrigeration air conditioning device.

25. A refrigeration air conditioning system as claimed in claim 21, wherein said lubricating oil is 2000 cst or less in viscosity at an evaporation temperature of said refrigeration air conditioning device.

26. A refrigeration air conditioning system as claimed in claim 20, wherein said lubricating oil is 200 cst or less in viscosity at ambient temperature.

27. A refrigeration air conditioning system as claimed in claim 21, wherein said lubricating oil is 200 cst or less in viscosity at ambient temperature.

28. A refrigeration air conditioning system as claimed in claim 20, wherein said compressor is a discharge pressure type compressor whose pressure in a shell is kept at a discharge side.

29. A refrigeration air conditioning system as claimed in claim 21, wherein said compressor is a discharge pressure type compressor whose pressure in a shell is kept at a discharge side.

30. A refrigeration air conditioning system as claimed in claim 20, further comprising means for preventing back flow from said compressor to said evaporator, said means being located between said compressor and said evaporator.

31. A refrigeration air conditioning system as claimed in claim 21, further comprising means for preventing back flow from said compressor to said evaporator, said means being located between said compressor and said evaporator.

* * * * *